March 8, 1949.    K. M. WATSON    2,463,729
PYROLYTIC CONVERSION OF HYDROCARBONS
Filed June 11, 1947
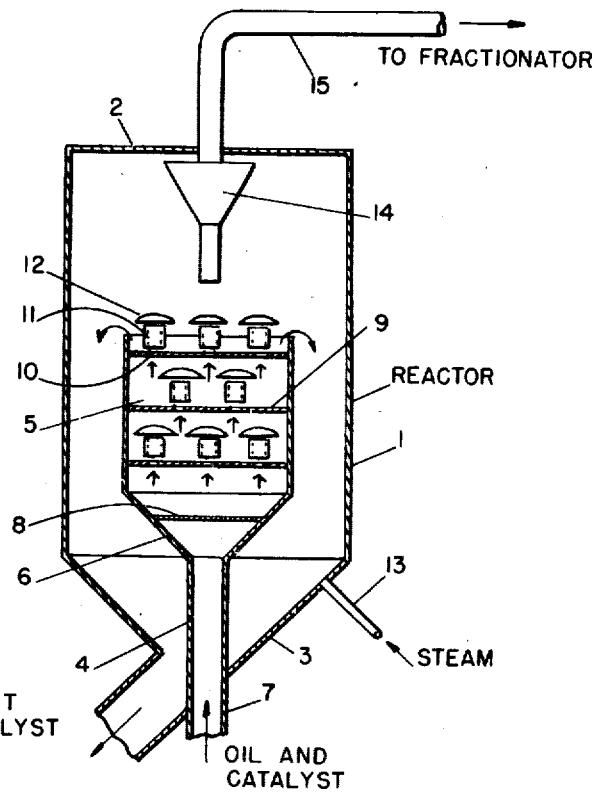
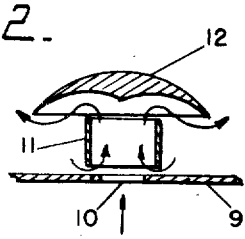
*INVENTOR.*
KENNETH MERLE WATSON
BY
Pennie, Edmonds, Morton & Barrows
ATTORNEYS Patented Mar. 8, 1949

2,463,729

UNITED STATES PATENT OFFICE 2,463,729

PYROLYTIC CONVERSION OF HYDROCARBONS

Kenneth Merle Watson, Madison, Wis., assignor to Sinclair Refining Company, New York, N. Y., a corporation of Maine Application June 11, 1947, Serial No. 754,022

4 Claims. (Cl. 196—52)

This invention relates to the pyrolytic conversion of hydrocarbons and, more particularly, to pyrolytic conversion processes involving the use of a finely divided solid catalyst.

The invention is especially applicable to conversion processes of the general type wherein a finely divided catalyst at elevated temperature is suspended in the charge oil passing to a reactor in which conversion of the oil occurs and in which the spent catalyst is separated from the oil vapors, the separated catalyst stripped of oil, regenerated by decarbonizing the catalyst and the regenerated catalyst again suspended in the stream of charge oil passing to the reactor. Operations of the type described are commonly designated fluid catalyst processes.

In conventional fluid catalyst operations as described, the spent catalyst is passed to the reaction zone in suspension in the charge oil, usually in the vapor phase, and is maintained in a fluidized state in the reactor in contact with the oil vapors during the conversion of the latter.

In order to obtain the maximum yield of the desired reaction product, thorough and uniform contact between the hydrocarbons vapors and the catalyst in the reaction zone is essential. According to customary procedure, the suspension of catalyst in hydrocarbon vapors is introduced into the lower part of a vertically elongated chamber of large transverse area. Upon entering this chamber, there is a tendency for the catalyst to drop out of suspension forming a so-called dense phase bed of fluidized catalyst of considerable depth. The hydrocarbon vapors move upwardly through this bed of catalyst maintaining it in a fluidized, highly turbulent state. Because of this condition, there is a mixing of the catalyst resulting in a homogeneous mass of catalyst in the bed, consisting of spent and partially spent catalyst mixed with fresh incoming catalyst and of less than maximum catalytic effectiveness.

Further, under such conditions, there is a tendency for large globules of the vapors to pass upwardly through the catalyst bed without coming into intimate contact with the catalyst.

The present invention provides an improved method of effecting thorough and intimate contact between the hydrocarbon vapors and the catalyst in the reaction zone and also provides improved apparatus especially adapted to the carrying out of the process.

In accordance with my present invention, the suspension of hydrocarbon vapors and catalyst is passed upwardly through a plurality of successive vertically spaced zones, delineated by horizontally positioned, perforated trays or distributor plates. The perforations in the respective trays are spaced apart a considerable distance and are of such aggregate area as to cause the vapors to pass upwardly therethrough at a decidedly increased velocity.

Positioned above each perforation and vertically spaced from the tray, I provide a collar or chimney of somewhat larger inner diameter than the diameter of the perforation, so that the dense phase bed of catalyst which accumulates on each of the trays is re-entrained in the stream of vapors passing upwardly through the perforation and jetted upwardly through the chimney.

Positioned above each chimney, I provide a baffle so designed as to deflect the stream of suspension downwardly and outwardly over the chimney, with high turbulence and mixing, so as to distribute the catalyst, dropping out of suspension by reason of decreased velocity of flow, uniformly over the bed of catalyst on the trays.

By this means, the catalyst is repeatedly re-entrained in the rising vapors, a portion of the catalyst being redistributed on the tray from which it was entrained and a portion thereof passing with the vapors to the next higher zone. The catalyst thus gradually works its way to the uppermost zone where it becomes disengaged from the hydrocarbon vapors, products of the conversion, and is passed to the stripping or regenerating zone.

The invention will be more fully described and illustrated, by reference to the accompanying drawings which represent conventionally and somewhat diagrammatically a particularly advantageous embodiment of my invention and of which—

Figure 1 is a vertical sectional view of the apparatus, and

Figure 2 is a somewhat enlarged vertical sectional fragmentary view showing the arrangement of the perforated plate, the chimneys and baffles in greater detail.

The apparatus indicated by the reference numeral 1 of the drawing represents a generally cylindrical vertically elongated reaction chamber, closed at the top by cover plate 2 and closed at its lower end by a conical hopper 3, terminating in conduit 4. Coaxially positioned in the chamber 1 is a smaller inner chamber 5, in open communication with chamber 1 at its upper end and closed at its lower end by a cone-shaped member 6 terminating in conduit 7. Positioned in the lower part of chamber 5 is a perforated baffle, grid or distributor plate 8.

The chamber 5 is divided into a plurality of vertically spaced zones by the trays or distributor plates 9, having therein relatively large perforations 10. Above each perforation, there is suspended a cylindrical collar or chimney 11, vertically spaced from the tray and supported by any known means, not shown in the drawing. Coaxially positioned above each of the chimneys and vertically spaced therefrom, there is suspended, by known means not shown, an umbrella type baffle 12, such as more clearly shown in Figure 2 of the drawings.

In operation, the suspension of catalyst in hydrocarbon vapors to be converted is passed to the reactor through conduit 7, entering the lower end of chamber 5, is evenly distributed throughout the transverse area of the chamber by means of distributor plate 8 and passes upwardly through the successive vertically spaced zones.

There is a tendency for the catalyst to drop out of suspension, forming a dense phase body of catalyst on each of the trays 9, as the suspension passes through the large transverse area zones above the trays. The vapors pass upwardly through the perforations in the trays at greatly increased velocity, by reason of the diminishing area. The fluidized catalyst on the trays flows beneath the chimneys into the rising, high velocity streams of vapor and is caught up thereby and jetted upwardly through the chimneys 11 against the baffles 12. The baffles 12 are generally umbrella-shaped, projecting downwardly at their center portions, as shown in Figure 2, so that the rising stream of the suspension is deflected generally outwardly and downwardly, a large proportion of the suspended catalyst being evenly distributed over the surface of the body of catalyst on the tray.

As previously noted, a further portion of catalyst is carried upwardly with the vapors into the next higher zone.

On reaching the upper zone of the chamber 5, the fluidized body of catalyst overflows into the surrounding annular space within chamber 1 and gravitates downwardly therethrough to the lower end of chamber 1 from which it is withdrawn through conduit 4 and passed to a stripper or regenerator.

My invention also provides a desirable method and means of stripping readily vaporizable hydrocarbons from the catalyst before leaving the reactor and, for this purpose, I may inject steam, or other gaseous stripping medium, into the lower end of chamber 1 through line 13 so that the stripping medium passes upwardly through the catalyst gravitating downwardly through the annular space surrounding chamber 5. Conventional means may be employed for distributing the steam uniformly through the catalyst.

The hydrocarbon vapors, products of the conversion, together with the stripping medium when employed are passed from the upper portion of the chamber through a separator, diagrammatically indicated at 14, for the separation of suspended catalyst and, from thence, pass through conduit 15 to fractionating apparatus not shown.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of 5 to 25 pounds per square inch. The temperature of the catalyst undergoing regeneration may, with advantage, be maintained within the range of 950° to 1,200° F., temperatures above this range being avoided by known means. The invention contemplates the use of known methods and means for regenerating the catalyst and for stripping and conveying the catalyst through the system.

It will be understood that the invention is not restricted with respect to the particular type of fluid catalyst conversion processes but is applicable to various modifications of fluid catalyst processes in which the catalyst in finely divided form is brought into intimate contact with hydrocarbon vapors in the conversion zone.

I claim:

1. In the fluid catalyst process for the conversion of hydrocarbons wherein a finely divided catalyst at elevated temperature is brought into contact with hydrocarbon vapors to be converted in a conversion chamber, the step of effecting more thorough and uniform contact between the catalyst and hydrocarbon vapors in the conversion chamber, which comprises passing the suspension of catalyst and hydrocarbon vapors upwardly through a succession of vertically spaced zones of the conversion chamber, said zones being delineated by horizontally positioned perforated partitions, maintaining a bed of catalyst on each partition, entraining catalyst in the streams of vapor passing inwardly from the perforations in the respective partitions, deflecting the respective streams downwardly and radially outwardly, separating a portion of the catalyst carried by the vapor streams and distributing it over the bed of catalyst through which the vapors have just passed, the vapors containing residual catalyst passing as a plurality of streams up through the next higher catalyst bed, disengaging the catalyst from the hydrocarbon vapors in an upper zone and separately withdrawing the catalyst and hydrocarbon vapors from the conversion chamber.

2. Apparatus of the type described comprising a vertically elongated cylindrical chamber closed at its upper end and terminating at its lower end in a hopper member, a conduit leading from the lower end of the hopper member, a second vertically elongated chamber of smaller diameter and of less height than the first chamber, coaxially positioned in the first chamber, open at its upper end and closed at its lower end by a conical member terminating in a conduit, a plurality of vertically spaced, generally horizontally positioned perforated plates extending across the inner chamber, a chimney positioned above each perforation and vertically spaced from the plate, an umbrella-shaped baffle positioned above each chimney and vertically spaced from the upper end thereof, and conduit means leading from the upper end of the outer chamber.

3. Apparatus of the type described comprising a vertically elongated cylindrical chamber closed at its upper end and terminating at its lower end in a hopper member, a conduit leading from the lower end of the hopper member, a second vertically elongated chamber of smaller diameter and of less height than the first chamber, coaxially positioned in the first chamber, open at its upper end and closed at its lower end by a conical member terminating in a conduit, a plurality of vertically spaced, generally horizontally positioned perforated plates extending across the inner chamber, a chimney positioned above each perforation and vertically spaced from the plate, an umbrella-shaped baffle positioned above each chimney and vertically spaced from the upper end thereof, conduit means leading from the upper end of the outer chamber, and conduit means adapted to the introduction of a gaseous medium into the lower end of the outer chamber.

4. In the fluid catalyst process for the conversion of hydrocarbons wherein a finely divided catalyst at elevated temperature is brought into contact with hydrocarbon vapors to be converted in a conversion chamber and thereafter the catalyst is stripped of readily vaporizable hydrocarbons by contact with a gaseous stripping medium, the steps of effecting more uniform contact between the catalyst and the hydrocarbon vapors in the conversion zone and of stripping the catalyst which comprises passing the suspension of catalyst in hydrocarbon vapors upwardly through a succession of vertically spaced zones of the conversion chamber, said zones being delineated by horizontally positioned perforated partitions, maintaining a bed of catalyst on each partition, entraining catalyst in the stream of vapors passing upwardly through the perforations in the respective partitions, deflecting the respective streams downwardly and radially outwardly, separating a portion of the catalyst carried by the vapor streams and distributing it over the bed of catalyst through which the vapors have just passed, the vapors containing residual catalyst passing as a plurality of streams up through the next higher catalyst bed, disengaging the catalyst from the hydrocarbon vapors in the upper zone, passing the separated catalyst downwardly through a surrounding annular zone of the conversion chamber in contact with a rising current of gaseous stripping medium, whereby readily vaporizable hydrocarbons are stripped from the catalyst, passing stripped catalyst from a lower portion of the conversion chamber and withdrawing hydrocarbon vapors and stripping medium from an upper portion of the conversion chamber.

KENNETH MERLE WATSON.

REFERENCES CITED

The following references are of record in the file of this patent:

UNITED STATES PATENTS

| Number | Name | Date |
| --- | --- | --- |
| 2,288,613 | Dill | July 7, 1942 |
| 2,391,334 | Nicholson | Dec. 18, 1945 |